United States Patent [19]

Swindells et al.

[11] 4,145,401

[45] Mar. 20, 1979

[54] HIGH EFFICIENCY CHLORINE DIOXIDE PRODUCTION AT LOW ACIDITY WITH METHANOL ADDITION

[75] Inventors: Richard Swindells, Caledon; Maurice C. J. Fredette, Mississauga, both of Canada

[73] Assignee: ERCO Industries Limited, Islington, Canada

[21] Appl. No.: 770,362

[22] Filed: Feb. 22, 1977

[30] Foreign Application Priority Data

Mar. 19, 1976 [GB] United Kingdom ............... 11123/76
Mar. 8, 1977 [GB] United Kingdom ............... 18783/77

[51] Int. Cl.² ............................................... C01B 11/02
[52] U.S. Cl. ..................................... 423/478; 423/479
[58] Field of Search ..................... 423/478, 552, 479

[56] References Cited

U.S. PATENT DOCUMENTS

| 2,936,219 | 5/1960 | Rapson | 423/478 |
| 3,563,702 | 2/1971 | Partridge et al. | 423/478 |
| 3,793,439 | 2/1974 | Rapson | 423/478 |
| 3,816,077 | 6/1974 | Fuller et al. | 423/478 X |
| 3,864,456 | 2/1975 | Winfield et al. | 423/478 |
| 3,895,100 | 7/1975 | Cowley | 423/478 |

FOREIGN PATENT DOCUMENTS 656486 1/1963 Canada ..................................... 423/478

Primary Examiner—Brian Hearn
Attorney, Agent, or Firm—Sim & McBurney

[57] ABSTRACT

The efficiency of a low total acid normality chlorine dioxide producing process in which a chlorate, a chloride and sulphuric acid are fed to a reaction medium in a single chambered generator-evaporator-crystallizer vessel is increased by the use of small quantities of methanol.

5 Claims, No Drawings

HIGH EFFICIENCY CHLORINE DIOXIDE PRODUCTION AT LOW ACIDITY WITH METHANOL ADDITION

FIELD OF INVENTION

The present invention relates to the production of chlorine dioxide.

BACKGROUND TO THE INVENTION

It is known from U.S. Pat. No. 3,864,456 to produce chlorine dioxide and chlorine by reduction of sodium chlorate with sodium chloride and/or hydrogen chloride in the presence of sulphuric acid at a low acidity of about 2 to about 4.8 normal. The term "acidity" is usually considered to refer to the total acidity present as determined by titration with a solution of a known concentration of sodium hydroxide to a pre-selected pH end point. This determination is expressed in terms of normality, i.e., the equivalent number of gram atoms of hydrogen ions per liter of solution corresponding to the value titrated, and may be referred to as the "total acid normality". The term "acidity" as used in the prior patent refers to this determination and in this specification the term "total acid normality" will be used.

The process of the prior patent is carried out in a single chambered generator-evaporator-crystallizer vessel to form chlorine dioxide in continuous manner from a reaction medium held in the reaction vessel. The reaction medium is maintained at its boiling point at the prevailing absolute pressure in the reaction vessel and at a temperature below which substantial decomposition of chlorine dioxide occurs. The reaction vessel is maintained under a subatmospheric pressure to maintain the reaction medium at the boiling point and the water evaporated from the reaction medium is used as a diluent gas for the chlorine dioxide and chlorine formed. After start-up, by-product sodium sulphate is formed, its concentration builds up until the reaction medium is saturated thereby, and the sodium sulphate deposits from the reaction medium in the reaction vessel after reaching saturation in a neutral anhydrous form for removal therefrom.

The process is generally conducted under steady state conditions in which the quantity of water introduced to the reaction vessel with the reactants is balanced by the quantity of water removed from the reaction vessel, mainly as diluent gas for the chlorine dioxide and chlorine, so that the liquid level in the reaction vessel is maintained substantially constant.

The reactions which occur in the reaction medium in this prior art process are represented by the equations:

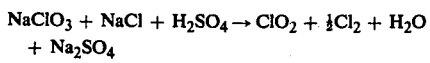

$$NaClO_3 + NaCl + H_2SO_4 \rightarrow ClO_2 + \tfrac{1}{2}Cl_2 + H_2O + Na_2SO_4 \quad (1)$$

$$NaClO_3 + 5NaCl + 3H_2SO_4 \rightarrow 3Cl_2 + 3H_2O + 3Na_2SO_4 \quad (2)$$

Part or all of the sodium chloride may be substituted for by hydrogen chloride. The hydrogen chloride then also provides part of the acid requirement of the system, the sulphuric acid requirement and sodium sulphate production being correspondingly decreased.

Any chlorate which is reacting by equation (2) produces only chlorine and hence represents an inefficiency in the process. The "efficiency" of the chlorine dioxide-producing process is considered to be the extent to which sodium chlorate is converted to chlorine dioxide in accordance with the reaction of equation (1).

The efficiency may be expressed as a percentage or as the "Gram Atom Percent Chlorine Dioxide" (or G.A.%ClO$_2$), which is a quantitative expression related to the efficiency of conversion of sodium chlorate to chlorine dioxide by the reaction of equation (1) and refers to the quantity of chlorine atoms formed as chlorine dioxide as a percentage of the total quantity of chlorine atoms formed in a particular gas mixture. Thus:

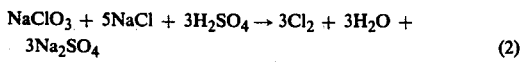

$$GA\%ClO_2 = \frac{Cl\ in\ ClO_2}{Cl\ in\ ClO_2 + Cl\ in\ Cl_2} \times 100 \quad (3)$$

It follows from equation (3) that the maximum gram atom percent chlorine dioxide obtainable is 50%, which is equivalent to an efficiency of 100%.

The process of U.S. Pat. No. 3,864,456 referred to above, while possessing many attributes which have led to wide commercial acceptance of the process, is less than 100% efficient, usually having an efficiency equivalent to GA% ClO$_2$ values of about 30 to about 44.

SUMMARY OF INVENTION

It has now been surprisingly found that the efficiency of the process of U.S. Pat. No. 3,864,456 may be increased, preferably to about 100% (equivalent to a GA%ClO$_2$ value of 50%), by the use of small quantities of methanol. The methanol is consumed in the generator and a continuous feed must be maintained in the continuous process.

It is theorized that the increase in efficiency of chlorine dioxide production observed in this invention results from reduction of chlorate by methanol.

GENERAL DESCRIPTION OF INVENTION

In this invention, it has been observed that the efficiency of chlorine dioxide increases rapidly with increasing quantities of methanol until the efficiency is approximately 100%. (Corresponding to 50 Gram Atom Percent ClO$_2$ in the gaseous mixture formed from the reaction medium). The quantity required depends on the operating parameters of the system and, for example, in a reactor operating at about 70° C., the most efficient reaction is that of about 0.1 lb MeOH per lb ClO$_2$.

If the quantity of methanol is increased beyond the level required to provide 100% efficient production of chlorine dioxide from a low total acid normality reaction medium to which a chlorate, a chloride and sulphuric acid are fed, then the relative proportion of chlorine dioxide to chlorine continues to increase but the reaction which then is carried out is a highly inefficient form of the Solvay process.

The enhancement of the efficiency of the chlorine dioxide-producing reaction in accordance with this invention using methanol may be supplemented, if desired, by the use of metal ionic catalysts known to improve the efficiency of the chlorine dioxide-producing reaction, such as silver ions or manganese ions, although such catalysts are not required to achieve high efficiency.

EXAMPLE

The following Example illustrates the invention further.

EXAMPLE 1

A single-chambered chlorine dioxide generator was run under certain reaction conditions and the efficiency of production of chlorine dioxide and the purity of chlorine dioxide were determined. Sodium chlorate solution, sodium chloride solution, sulphuric acid and methanol were the only feeds to the generator, the reaction medium was held at its boiling point under a subatmospheric pressure and anhydrous sodium sulphate precipitated from the aqueous phase. The reaction conditions and results appear in the following Table I:

TABLE I

| | |
|---|---|
| Temperature | 66° C |
| Pressure | 143 mm Hg |
| Liquor feed rates: | |
| MeOH | 50% 0.73 ml/min |
| $H_2SO_4$ | 9M 9.6 ml/min |
| $NaClO_3$ | 5.4M 9.6 ml/min |
| NaCl | 4.5M 12.4 ml/min |
| Generator Liquor: | |
| $H_2SO_4$ | 3.65N |
| $NaClO_3$ | 1.62M |
| NaCl | 0.79M |
| Crystals | $Na_2SO_4$ |
| Chlorine dioxide production rate | 0.24g/1/min |
| Gas analysis | 64% $ClO_2$ 36% $Cl_2$ |
| Efficiency based on chlorate | 99% |
| Feed requirements/lb. $ClO_2$ produced | 0.11 lb.$CH_3OH$ |
| | 0.98 lb.NaCl |

The efficiency based on chlorate of a chlorine dioxide generator operating under substantially the same conditions as the Table but omitting the methanol is about 96%.

The results of the above Table I thus shown an increased efficiency of chlorine dioxide production at low total acidities below about 4.8 normal in the presence of small quantities of methanol.

EXAMPLE 2

A chlorine dioxide generator of the type described in Example 1 was run under deliberately inefficient conditions (high mole ratios of chloride ion to chlorate ion in the generator liquor) and then in the presence of added quantities of methanol. The results obtained are reproduced in the following Table II:

TABLE II

| Run | A | B |
|---|---|---|
| Temperature (average) | 70° C | 67° C |
| Pressure (average) | 155 mm Hg | 153 mm Hg |
| Duration of run | 248 mins. | 244 mins. |
| Chloride to chlorate ratio in generator | 0.91 | 1.0 |
| Acidity | 3.4N | 3.9N |
| GA% $ClO_2$ in absence of methanol | 35.6 | 35.0 |
| GA% $ClO_2$ in presence of methanol | 49.6 | 49.8 |
| Total $NaClO_3$ feed (2.85M) (liters) | 2.92 | 2.73 |
| Total $H_2SO_4$ feed (77% w/w)(ml)* | 565 | 990 |
| Total MeOH feed (50% v/v) (ml) | 620 | 420 |

*Note: In run A, 150 ml of the $H_2SO_4$ feed was used to adjust the pH of the initial reaction mixture to 3.4N prior to commencement of chlorine dioxide production, while, in run B, 500 ml of $H_2SO_4$ feed was used to adjust the initial reaction mixture pH to 3.9N.

The results of the above Table II show that even a normally very low efficiency chlorine dioxide generating system can be increased to very high values using small quantities of methanol.

SUMMARY

The present invention, therefore, provides considerable improvement over the prior art low acidity system of producing chlorine dioxide. Modifications are possible within the scope of the invention.

What we claim is:

1. In a process for the production of chloride dioxide which comprises continuously reducing chlorate ions with chloride ions in an acid aqueous medium containing sulphuric acid and having a total acid normality of about 2 to about 4.8 normal by maintaining a reaction vessel containing said aqueous reaction medium under a subatmospheric pressure, maintaining said reaction medium at its boiling point at a temperature below that above which substantial decomposition of chlorine dioxide occurs to evaporate water from the reaction medium and provide a gaseous mixture containing steam, chlorine dioxide and chlorine, removing said gaseous mixture from said reaction vessel, recovering an aqueous solution of chlorine dioxide from said removed mixture, maintaining substantially steady state conditions in said reaction medium by continuously feeding sodium chlorate, said chloride, and sulphuric acid into said reaction medium to make up chemicals consumed in said reducing step and to maintain said total acid normality in said reaction medium in the range of about 2 to about 4.8 normal, maintaining the liquid level in said reaction vessel substantially constant by balancing water fed to the reaction vessel with water removed therefrom, continuously depositing a salt comprising anhydrous neutral sodium sulphate from said reaction medium after the reaction medium becomes saturated thereby after the initial start-up of the process, and removing said deposited salt from said reaction vessel, the improvement which comprises carrying out said process in the presence of methanol in quantities sufficient to improve the efficiency of conversion of chlorate ions to chlorine dioxide by said process.

2. The process of claim 1 wherein said chloride is provided by sodium chloride, hydrogen chloride or mixtures thereof.

3. The process of claim 1 wherein up to 0.1 lb of methanol per lb. of $ClO_2$ formed is used.

4. The process of claim 1 wherein said reaction medium also contains ionic species catalytically improving the efficiency of the conversion of chlorate ions to chlorine dioxide.

5. The process of claim 1 wherein sufficient methanol is used to achieve approximately 100% efficiency of conversion of chlorate ions to chlorine dioxide.

* * * * *